(12) United States Patent
Matsuzaka et al.

(10) Patent No.: US 8,012,568 B2
(45) Date of Patent: Sep. 6, 2011

(54) LAMINATED SHAPE-RETAINABLE SHEET, CORE FOR BRIM OF HEADWEAR USING THE SAME, BRIM OF HEADWEAR, AND HEADWEAR

(75) Inventors: Katsuo Matsuzaka, Kyoto (JP); Yujiro Hirao, Kyoto (JP)

(73) Assignee: Sekisui Seikei, Ltd., Osaka (JP)

( * ) Notice: Subject to any disclaimer, the term of this patent is extended or adjusted under 35 U.S.C. 154(b) by 632 days.

(21) Appl. No.: 11/791,114

(22) PCT Filed: Nov. 16, 2005

(86) PCT No.: PCT/JP2005/021016
§ 371 (c)(1),
(2), (4) Date: May 21, 2007

(87) PCT Pub. No.: WO2006/057186
PCT Pub. Date: Jun. 1, 2006

(65) Prior Publication Data
US 2008/0110559 A1    May 15, 2008

(30) Foreign Application Priority Data

Nov. 24, 2004 (JP) ................................. 2004-339311
Jun. 7, 2005 (JP) ................................. 2005-166672

(51) Int. Cl.
*B32B 3/28* (2006.01)
*B32B 3/30* (2006.01)
*A42B 1/06* (2006.01)

(52) U.S. Cl. .............. 428/172; 428/181; 428/184; 2/10; 2/195.5

(58) Field of Classification Search .................. 428/181, 428/182, 184, 185, 172; 2/195.5, 195.6, 2/410, 439, 452, 10; 156/205, 206; 425/194, 425/363, 369

See application file for complete search history.

(56) References Cited

U.S. PATENT DOCUMENTS

| 3,025,004 A | | 3/1962 | Levi | |
| 3,542,635 A | * | 11/1970 | Parker | 428/131 |
| 3,778,333 A | * | 12/1973 | Rasmussen | 428/181 |
| 3,811,130 A | * | 5/1974 | Townsend, Jr. | 2/175.1 |
| 4,910,064 A | * | 3/1990 | Sabee | 428/113 |

FOREIGN PATENT DOCUMENTS

| JP | 8-49998 | | 2/1996 |
| JP | 11-93012 | | 4/1999 |
| JP | 2004-114451 | | 4/2004 |
| JP | 2004-115948 | | 4/2004 |
| JP | 2004-218120 | | 8/2004 |
| WO | WO 2004/054793 | * | 7/2004 |

OTHER PUBLICATIONS

Supplementary European Search Report issued in corresponding European Application No. 05 80 7018, in the English language.

* cited by examiner

*Primary Examiner* — Donald J Loney
(74) *Attorney, Agent, or Firm* — Wenderoth, Lind & Ponack, L.L.P.

(57) ABSTRACT

The invention provides a laminated shape-retainable sheet which has such a sufficient shape retainability that a user can give a desired shape easily to the sheet, and requires no press working step for giving a curved shape, a core for a headwear brim using the same, a brim of a headwear, and a headwear. In the laminated shape-retainable sheet of the invention, shape-retainable sheets each comprising a thermoplastic resin and each having shape retainability in a monoaxial direction are laminated and bonded onto each other in such a manner that the monoaxial directions of adjacent sheets out of the shape-retainable sheets make a predetermined angle, in particular, 45 to 90 degrees.

5 Claims, 2 Drawing Sheets

1

LAMINATED SHAPE-RETAINABLE SHEET, CORE FOR BRIM OF HEADWEAR USING THE SAME, BRIM OF HEADWEAR, AND HEADWEAR

TECHNICAL FIELD

The present invention relates to a laminated shape-retainable sheet excellent in shape retainability; a core for a headwear, using the same; a brim of a headwear; a headwear; a process for producing a laminated shape-retainable sheet; and a folding apparatus for making folds in a mono-axially drawn thermosetting resin sheet or a laminated sheet.

In the present specification, the word "shape-retainable or shape retention" means a state that, for example, when a user deforms an object at will to form a desired shape, the shape can be retained.

BACKGROUND ART

Hitherto, headwears have each been made of cloth, and the brim thereof has been produced by laminating plural pieces of cloth and then sewing or stitching the pieces. However, when it rains, cloth gets wet and absorbs rainwater so as to become heavy and deform. Recently, therefore, there have been used headwears made of synthetic resin, or headwears wherein only a brim thereof is made of synthetic resin.

Suggested is, for example, a cap comprising a peak having a core made of a low-level-foamed PE plate wherein the peak is formed into a curved face form by heating and pressing and is further rapidly cooled, thereby attaining the "shape retention" thereof (see, for example, Patent Document 1). Patent Document 1: Japanese Laid-Open Patent Publication No. 2004-218120

However, the peak of the cap is a peak which undergoes only high-temperature pressing and rapid cooling; accordingly, the shape retention is different from the shape retention defined in the present invention. Thus, the cap has drawbacks that a user cannot give a desired shape to the cap with ease and further pressing work into the curved face shape is necessary so that costs for the work increase.

DISCLOSURE OF THE INVENTION

Problems to be Solved by the Invention

In light of the above-mentioned drawbacks, an object of the invention is to provide a laminated shape-retainable sheet which has such a sufficient shape retainability that a user can give a desired shape easily to the sheet, and requires no press working step for giving a curved shape, a core for a headwear brim using the same, a brim of a headwear, and a headwear.

Furthermore, a different object of the invention is to provide a process for producing the laminated shape-retainable sheet, and a folding apparatus used therefor.

Means for Solving the Problems

The laminated shape-retainable sheet of the invention is characterized in that shape-retainable sheets each comprising a thermoplastic resin and each having shape retainability in a monoaxial direction are laminated and bonded onto each other in such a manner that the monoaxial directions of adjacent sheets out of the shape-retainable sheets make a predetermined angle.

The shape-retainable sheets are each a sheet which is made of a thermoplastic resin and have shape retainability in a monoaxial direction. Any thermoplastic resin can be used as long as the sheet is a sheet which can retain the shape thereof when the sheet is folded. Since the sheet is preferably made of a light and sanitary material, the sheet is preferably a mono-axially drawn thermoplastic resin sheet and is in particular preferably a mono-axially drawn olefin resin sheet having a total draw ratio of 10 to 40.

The olefin resin which constitutes the mono-axially drawn olefin resin sheet may be any olefin resin having film-formability. Examples thereof include high density polyethylene resin, middle density polyethylene resin, low density polyethylene resin, linear low density polyethylene resin, polypropylene resin, ethylene/propylene copolymer, ethylene/pentene-1 copolymer, ethylene/vinyl acetate copolymer, ethylene/(meth)acrylic acid ester copolymer, ethylene/vinyl chloride copolymer, and ethylene/propylene/butene copolymer. High density polyethylene resin is preferably used.

The mono-axially drawn olefin resin sheet is preferably a sheet which is drawn to a high extent of 10 to 40 times and further expresses a high shape retainability by the drawing. When the density of the high density polyethylene resin becomes smaller, high-ratio drawing thereof, which causes a high shape retainability, tends to become difficult. Thus, the density is preferably 0.94 g/cm$^3$ or more.

If the weight-average molecular weight of the high density polyethylene resin becomes too small, molding of a non-drawn original sheet thereof by extrusion tends to become difficult. If the molecular weight becomes too large, molding into a film or drawing tends to become difficult. Thus, the molecular weight is preferably from 200000 to 500000. The melt index (MI) is preferably from 0.1 to 20, more preferably from 0.2 to 10 since an excellent film-formability is given.

If the total draw ratio of the mono-axially drawn olefin resin sheet is small, the shape retainability tends to be unable to be exhibited. If the ratio is large, the sheet tends to be torn sideways. Thus, the total draw ratio is preferably from 10 to 40, more preferably from 10 to 30.

As the method for drawing the olefin resin sheet, any method known in the prior art may be adopted. Since the sheet is drawn into a high extent of 10 to 40 times, preferred is a method of rolling the olefin resin sheet and then drawing the resultant mono-axially or drawing the resultant multistage mono-axially, wherein mono-axial drawing is repeated plural times.

Specifically, preferred is an olefin resin sheet obtained by rolling an original sheet into a rolling ratio of 5 to 10, and then drawing the resultant mono-axially into a draw ratio of 1.3 to 4, thereby making the total draw ratio into the range of 10 to 40. The total draw ratio is the product of the rolling ratio and the draw ratio.

The rolling is a method of supplying an olefin resin sheet between a pair of rolls rotating in reverse directions to press the sheet, thereby making the thickness of the sheet smaller and further making the sheet longer. In the rolled sheet, the olefin resin becomes dense without being oriented, which is different from any drawn sheet. Thus, the rolled sheet is easily drawn to a high extent.

If the rolling temperature becomes low, the sheet cannot be uniformly rolled. If the temperature becomes high, the sheet is melted and cut. Thus, the roll temperature in the rolling is preferably from "the melting point of the olefin resin of the olefin resin sheet to be rolled −40° C." to "the melting point", more preferably from "the melting point −30° C." to "the melting point −5° C.".

In the present invention, the melting point means the following: at the time of performing thermal analysis of a material with a differential scanning calorimeter (DSC), the maximum point out of endothermic peaks accompanying the melting of the crystal thereof.

If the rolling ratio is small, a burden will be imposed on subsequent monoaxial drawing. If the ratio is large, the rolling becomes difficult. Thus, the rolling ratio is preferably from 5 to 10. In the invention, the rolling ratio and the draw ratio are each a value obtained by dividing the area of a cross section of a sheet before rolling or drawing by that of the cross section of the sheet after the rolling or the drawing.

The above-mentioned monoaxial drawing may be performed by any method known in the prior art, and is, for example, a method of drawing the original sheet while heating the sheet by action of a heater or hot wind by a roll drawing or zone drawing method.

If the drawing temperature becomes low, the sheet cannot be uniformly drawn. If the temperature becomes high, the sheet tends to be melted and cut. Thus, the drawing temperature is preferably from "the melting point of the olefin resin of the olefin resin sheet to be drawn −60° C." to "the melting point", more preferably from "the melting point of the olefin resin −50° C." to "the melting point −5° C.".

Since the total draw ratio is from 10 to 40, the draw ratio should be decided to set the total draw ratio into this range, considering the rolling ratio. If the draw ratio is small, the shape retainability tends to lower. If the draw ratio is large, the sheet tends to be cracked sideways or make a sound when the sheet is folded. Thus, the draw ratio is preferably from 1.3 to 4, more preferably from 1.5 to 3.

If the mono-axially drawn olefin resin sheet becomes thin, the mechanical strength tends to lower. If the sheet becomes thick, the sheet tends to be easily cracked in the draw direction. Thus, the thickness is generally from 0.05 to 1 mm, preferably from 0.1 to 0.5 mm.

When the shape-retainable sheet is folded, the sheet may be folded while plosive sounds of "paripari [transliteration]" are produced. It is therefore preferred that nicks or folds are made at intervals of 5 mm or less in substantially parallel to the axial direction having shape retainability.

The nicks may be made to penetrate the shape-retainable sheet, or may be made not to penetrate the sheet. The nicks may be made in only one surface of the shape-retainable sheet, or may be made in both surfaces thereof. The directions of the folds are not particularly limited. Thus, examples of the folds include folds which are made into the same face direction, folds which are made alternately into different face directions, and folds made at random.

When the shape-retainable sheet is folded in substantially parallel to the axial direction having shape retainability, the sheet tends to be folded or broken with the production of plosive sounds of "paripari" if the intervals between the nicks or the folds are each wider than 5 mm. Thus, the nicks or folds are made preferably at intervals of 5 mm or less, more preferably at those of 3 mm or less, even more preferably at those of 0.5 to 2 mm in plurality.

The shape-retainable sheet is preferably a laminated sheet of the above-mentioned mono-axially drawn thermoplastic resin sheet and a thermoplastic resin sheet which is not substantially drawn. In this case, the sheet is less folded or broken with the production of plosive sounds of "paripari" when the sheet is folded in substantially parallel to the axial direction having shape retainability.

The mono-axially drawn thermoplastic resin sheet is as described above. The thermoplastic resin sheet is a thermoplastic resin sheet which is not substantially drawn, and preferably has a small thickness and a small tensile elasticity. The tensile elasticity is preferably 1 GPa or less.

If the thickness of the mono-axially drawn thermoplastic resin sheet becomes small, the mechanical strength tends to lower. If the thickness becomes large, the sheet tends to be cracked in the draw direction. Thus, the thickness is generally from 0.05 to 1 mm, more preferably from 0.1 to 0.5 mm. The thickness of the thermoplastic resin sheet which is not drawn is preferably from 0.005 to 0.1 mm.

The thermoplastic resin sheet which is not substantially drawn may be laminated onto only one surface of the mono-axially drawn thermoplastic resin sheet, or may be laminated onto each of both surfaces thereof.

The thermoplastic resin sheet may be any thermoplastic resin sheet, and examples thereof include a sheet of any one of the above-mentioned olefin resin sheet, an acrylic resin sheet, and a polyester resin sheet. The thermoplastic resin sheet is preferably bonded strongly to the mono-axially drawn thermoplastic resin sheet; therefore, in the case that the mono-axially drawn thermoplastic resin sheet is an olefin resin sheet, the thermoplastic resin sheet is preferably an olefin resin sheet and is in particular preferably a sheet of low density polyethylene resin or linear low density polyethylene resin.

The film which is not substantially drawn may be a film drawn when it is produced. For example, a film produced by an inflation process is slightly drawn at the time of the inflation. Thus, this film is an example of the film which is not substantially drawn.

As the method for laminating the mono-axially drawn thermoplastic resin sheet and the thermoplastic resin sheet onto each other, any laminating method known in the prior art may be adopted. Examples thereof include a method of overlapping the mono-axially drawn thermoplastic resin sheet and the thermoplastic resin sheet with each other, and bonding the sheets through an adhesive or binder such as a rubbery, acrylic, urethane or silicone adhesive or binder; a method of bonding the sheets through a hot melt adhesive such as ethylene/vinyl acetate copolymer or linear low density polyethylene resin; and a method of laminating a low melting point resin film made of ethylene/vinyl acetate copolymer, linear low density polyethylene resin or the like between the mono-axially drawn thermoplastic resin sheet and the thermoplastic resin sheet, and then melting and bonding the sheets and the film thermally.

If the adhesive or binder is too hard, shape-recovering force acts strongly against the shape retainability of the mono-axially drawn thermoplastic resin sheet. Thus, the above-mentioned relatively soft adhesive or binder is preferably used.

When the sheets are bonded through a hot melt adhesive, the bonding may be attained while the hot melt adhesive is melted and painted. Alternatively, the bonding may be attained by laminating a hot melt adhesive sheet and then heating the resultant lamination under pressure. However, if the heating temperature becomes high, the mono-axially drawn thermoplastic resin sheet comes to shrink. Thus, it is preferred that the bonding is attained at a temperature at which the mono-axially drawn thermoplastic resin sheet does not substantially shrink thermally, that is, at a temperature not higher than the "the melting point of the thermoplastic resin which constitutes the mono-axially drawn thermoplastic resin sheet −10° C.".

As for the shape-retainable sheet also, it is preferred that nicks or folds are made at intervals of 5 mm or less in substantially parallel to the axial direction having shape retainability in order to prevent the sheet from being folded with the production of plosive sounds of "paripari" when the sheet is folded.

The form of the nicks may be any one of the forms described below. It is at least essential that the nicks are made in the mono-axially drawn thermoplastic resin sheet.

(1) The nicks are made to penetrate the whole of the shape-retainable sheet.
(2) The nicks are made to penetrate only the mono-axially drawn thermoplastic resin sheet.
(3) The nicks are made to penetrate the mono-axially drawn thermoplastic resin sheet and one of the thermoplastic resin sheets.
(4) The nicks are made not to penetrate one face of the mono-axially drawn thermoplastic resin sheet, or not to penetrate both faces thereof.
(5) The nicks are made to penetrate at least one of the thermoplastic resin sheets but not to penetrate the mono-axially drawn thermoplastic resin sheet.
(6) The nicks are made in combination of the above.

The directions of the folds are not particularly limited. Thus, examples of the folds include folds which are made into the same face direction, folds which are made alternately into different face directions, and folds made at random.

When the shape-retainable sheet is folded in substantially parallel to the axial direction having shape retainability, the sheet tends to be folded or broken with the production of plosive sounds of "paripari" if the intervals between the nicks or the folds are each wider than 5 mm. Thus, the nicks or folds are made preferably at intervals of 5 mm or less, more preferably at those of 3 mm or less, even more preferably at those of 0.5 to 2 mm.

The method for producing the shape-retainable sheet, which is a laminated sheet of the mono-axially drawn thermoplastic resin sheet and the thermoplastic resin sheet which is not substantially drawn and has nicks, is not particularly limited, and preferably comprises the step of performing slitting at intervals of 5 mm or less in substantially parallel to the axial direction having shape retainability to make the nicks, and the step of laminating and bonding the resultant mono-axially drawn thermoplastic resin sheet and the thermoplastic resin sheet which is not substantially drawn onto each other.

The method to be adopted for slitting the mono-axially drawn thermoplastic resin sheet at intervals of 5 mm or less in substantially parallel to the axial direction having shape retainability to make the nicks may be any method known in the prior art. The method is, for example, a method of pushing the mono-axially drawn thermoplastic resin sheet in substantially parallel to the axial direction against a roller or cutter wherein cutting blades are set at intervals of 5 mm or less, and then pulling out the sheet, thereby slitting the sheet in substantially parallel to the axial direction to make the nicks.

The order of the step of making the nicks and the step of the lamination and bonding may be selected at will. Thus, it is allowable to make the nicks in the mono-axially drawn thermoplastic resin sheet (and the thermoplastic resin sheet which is not substantially drawn), and subsequently laminate and bond the mono-axially drawn thermoplastic resin sheet and the thermoplastic resin sheet which is not substantially drawn onto each other, or to laminate and bond the mono-axially drawn thermoplastic resin sheet and the thermoplastic resin sheet which is not substantially drawn onto each other, and subsequently make the nicks in the mono-axially drawn thermoplastic resin sheet (and the thermoplastic resin sheet which is not substantially drawn).

The directions of the folds are not particularly limited. Thus, examples of the folds include folds extending into the same face direction, folds which are made alternately into different face directions, and folds made at random.

When the shape-retainable sheet wherein folds are made in the mono-axially drawn thermoplastic resin sheet is produced, it is preferred to use a method of folding the mono-axially drawn thermoplastic resin sheet at intervals of 5 mm or less in substantially parallel to the axial direction having shape retainability to make the folds in the sheet, and subsequently laminating and bonding this sheet onto the thermoplastic resin sheet which is not substantially drawn.

The method for making the folds in the mono-axially drawn thermoplastic resin sheet is not particularly limited. Preferably, the folds are made by means of a folding apparatus since it is preferred to make the folds at regular intervals in the mono-axially drawn thermoplastic resin sheet.

The folding apparatus is preferably a folding apparatus for making folds in the mono-axially drawn thermoplastic resin sheet, comprising two rolls wherein convex stripes and concave stripes parallel to rotating directions of the rolls are alternately formed, wherein the convex stripes in one of the rolls are fitted into the concave stripes in the other thereof.

The following will describe the folding apparatus for making folds in the mono-axially drawn thermoplastic resin sheet with reference to the drawings. FIG. 1 is a side view illustrating an example of the folding apparatus for making folds in the mono-axially drawn thermoplastic resin sheet, and FIG. 2 is an enlarged sectional view of its main portion.

In the figures, reference numbers 1 and 2 represent an upper roll and a lower roll, respectively. In the upper roll 1, convex stripes 11, 11 . . . . . . and concave stripes 12, 12 . . . . . . are alternatively made in parallel to the rotating direction of the roll. In the lower roll 2 also, convex stripes 21, 21, . . . . . . and concave stripes 22, 22 . . . . . . are alternatively made in parallel to the rotating direction of the roll.

In order to make appropriate folds in the mono-axially drawn thermoplastic resin sheet, the convex stripes 21 are preferably set in such a manner that the convex stripes 21 go toward the concave stripes 12 from a line for connecting adjacent stripes 11 and 11 out of the convex stripes 11 preferably by a distance of 0.05 to 1 mm, more preferably by that of 0.1 to 0.5 mm.

The convex stripes 11 and the convex stripes 21 have substantially the same shape as the concave stripes 12 and the concave stripes 22, and the convex stripes 11 are set to be fitted into the concave stripes 22, and the convex stripes 21 are set to be fitted into the concave stripes 12. The interval between the upper roll 1 and the lower roll 2 (the interval between the convex stripes 11 and the concave stripes 22, and the interval between the convex stripes 21 and the concave stripes 12) may be appropriately decided to make folds in the mono-axially drawn thermoplastic resin sheet to be folded. In general, the interval is preferably from the thickness of the mono-axially drawn thermoplastic resin sheet to the thickness of the synthetic resin sheet plus 2 mm.

The pitch of the convex stripes 11 is equal to that of the convex stripes 21, and is 10 mm or less since the folds are made at intervals of 5 mm or less. The height may be appropriately decided in accordance with the thickness of the mono-axially drawn thermoplastic resin sheet to be folded. In general, the height is preferably from 2 to 5 mm.

FIG. 3 is an enlarged sectional view of a main portion of a different folding apparatus. In an upper roll 1', convex stripes 13, 13 . . . . . . and concave stripes 14, 14 . . . . . . are alternatively made in parallel to the rotating direction of the roll. In a lower roll 2' also, convex stripes 23, 23 . . . . . . and concave stripes 24, 24 . . . . . . are alternatively made in parallel to the rotating direction of the roll.

The convex stripes 13 are set to be fitted into the concave stripes 24, and the convex stripes 23 are set to be fitted into the concave stripes 14. The pitch of the convex stripes 13 is equal to that of the convex stripes 23. The convex stripes 13 are made higher than the convex stripes 23. Folds are made by action of only the convex stripes 13.

The pitch of the convex stripes 13 and that of the convex stripes 23 are each 5 mm or less since the folds are made at intervals of 5 mm or less. The heights of the convex stripes 13 and the convex stripes 23 may each be appropriately decided in accordance with the thickness of the mono-axially drawn thermoplastic resin sheet to be folded. In general, the height of the convex stripes 13 is preferably from 2 to 5 mm and, preferably, the height of the convex stripes 23 is lower than that of the convex stripes 13 by 0.5 mm or more and is further from 1 to 2 mm.

The interval between the upper roll 1' and the lower roll 2' (the interval between the convex stripes 13 and the concave stripes 24) may be appropriately decided to make folds in the mono-axially drawn thermoplastic resin sheet to be folded. In general, the interval is preferably from the thickness of the mono-axially drawn thermoplastic resin sheet to the thickness of the mono-axially drawn thermoplastic resin sheet plus 1 mm.

In order to make appropriate folds in the mono-axially drawn thermoplastic resin sheet, the convex stripes 13 are preferably set in such a manner that the convex stripes 13 go toward the concave stripes 24 from a line for connecting adjacent stripes 23 and 23 out of the convex stripes 23 preferably by a distance of 0.05 to 1 mm, more preferably by that of 0.1 to 0.5 mm.

The pitch of the convex stripes 13 is equal to that of the convex stripes 23, and is 10 mm or less since the folds are made at intervals of 5 mm or less. The height may be appropriately decided in accordance with the thickness of the mono-axially drawn thermoplastic resin sheet to be folded. In general, the height is preferably from 2 to 5 mm.

FIG. 4 is an enlarged sectional view of a main portion of a further different folding apparatus. In an upper roll 1, convex stripes 15, 15 . . . . . . , which each have a sharp tip, and concave stripes 16, 16 . . . . . . are alternatively made in parallel to the rotating direction of the roll. In a lower roll 2" also, flat convex stripes 25, 25, . . . . . . and concave stripes 26, 26, . . . . . . , the bottom faces of which are flat, are alternatively made in parallel to the rotating direction of the roll.

The convex stripes 15 are set to be fitted into the concave stripes 26, and the convex stripes 25 are set to be fitted into the concave stripes 16. The pitch of the convex stripes 15 is equal to that of the concave stripes 26. The convex stripes 15 are made higher than the convex stripes 25. Folds are made only by pushing the mono-axially drawn thermoplastic resin sheet by means of the convex stripes 15.

The pitch of the convex stripes 15 and that of the concave stripes 26 are each 5 mm or less since the folds are made at intervals of 5 mm or less. The heights of the convex stripes 15 and the convex stripes 25 may each be appropriately decided in accordance with the thickness of the mono-axially drawn thermoplastic resin sheet to be folded. In general, the height of the convex stripes 15 is preferably from 2 to 5 mm and, preferably, the height of the convex stripes 25 is lower than that of the convex stripes 15 by 0.5 mm or more and is further from 1 to 2 mm.

The interval between the upper roll 1" and the lower roll 2" (the interval between the convex stripes 15 and the concave stripes 26) may be appropriately decided to make folds in the mono-axially drawn thermoplastic resin sheet to be folded. In general, the interval is preferably from the thickness of the mono-axially drawn thermoplastic resin sheet to the thickness of the mono-axially drawn thermoplastic resin sheet plus 1 mm.

In order to make appropriate folds in the mono-axially drawn thermoplastic resin sheet, the convex stripes 15 are preferably set in such a manner that the convex stripes 15 go toward the concave stripes 26 from a line for connecting adjacent stripes 25 and 25 out of the convex stripes 25 preferably by a distance of 0.05 to 1 mm, more preferably by that of 0.1 to 0.5 mm.

The upper roll 1 and the lower roll 2 may be fixed and may be fixed so as to be freely rotated. In this case, the mono-axially drawn thermoplastic resin sheet is supplied between the upper roll 1 and the lower roll 2, and then pulled out, whereby folds can be made in the mono-axially drawn thermoplastic resin sheet.

It is allowable to connect a driving device to at least one of the upper roll 1 and the lower roll 2 and use at least one of the upper roll 1 and the lower roll 2 as a driving roll. In this case, the mono-axially drawn thermoplastic resin sheet is supplied between the upper roll 1 and the lower roll 2, whereby folds can be made in the mono-axially drawn thermoplastic resin sheet while the sheet is transported by means of the driving roll.

The method for laminating and bonding the mono-axially drawn thermoplastic resin sheet wherein folds are made and the thermoplastic resin sheet which is not substantially drawn onto each other is not particularly limited, and is, for example, the above-mentioned method of laminating and bonding the mono-axially drawn thermoplastic resin sheet wherein nicks are made and the thermoplastic resin sheet which is not substantially drawn onto each other.

A different preferred method for producing the shape-retainable sheet wherein folds are made in the mono-axially drawn thermoplastic resin sheet is a method of laminating and bonding the mono-axially drawn thermoplastic resin sheet and the thermoplastic resin sheet which is not substantially drawn onto each other to yield a laminated sheet, and then folding the laminated sheet at intervals of 5 mm in the mono-axial direction of the sheet having shape retainability, thereby making folds in the laminated sheet.

The method for laminating and bonding the mono-axially drawn thermoplastic resin sheet and the thermoplastic resin sheet which is not substantially drawn onto each other to yield a laminated sheet is not particularly limited, and is, for example, the above-mentioned method of laminating and bonding the mono-axially drawn thermoplastic resin sheet wherein nicks are made and the thermoplastic resin sheet which is not substantially drawn onto each other.

The method for making folds in the resultant laminated sheet is not particularly limited. The folds are preferably made by means of the above-mentioned folding apparatus since the folds are preferably evenly made in the laminated sheet at regular intervals.

In the laminated shape-retainable sheet of the invention, the above-mentioned shape-retainable sheets are laminated and bonded onto each other in such a manner that the mono-axial directions (draw directions) of adjacent sheets out of the shape-retainable sheets make a predetermined angle.

If the predetermined angle becomes smaller, the difference between the monoaxial directions (draw directions) of the laminated shape-retainable sheets becomes small so that the axes become along the same direction. Thus, when the laminated shape-retainable sheet is folded in the direction perpendicular to the axial direction, the shape retainability tends not to be exhibited with ease. Thus, the angle is preferably from 45 to 90 degrees, more preferably 90 degrees.

The number of the laminated shape-retainable sheets may be appropriately decided in accordance with the usage or the thickness of the shape-retainable sheets, and is in general preferably from 2 to 16.

As the method for laminating and bonding the shape-retainable sheets onto each other, any laminating and bonding method known in the prior art may be adopted. Examples thereof include a method of overlapping the shape-retainable sheets with each other, and bonding the sheets through an adhesive or binder such as a rubber, acrylate, urethane or silicone adhesive or binder; a method of bonding the sheets through a hot melt adhesive such as ethylene/vinyl acetate copolymer or linear low density polyethylene resin; and a method of laminating a low melting point resin film made of ethylene/vinyl acetate copolymer, linear low density polyethylene resin or the like between the shape-retainable sheets, and then melting and bonding the sheets and the film thermally.

When the sheets are bonded through a hot melt adhesive, the bonding may be attained while the hot melt adhesive is melted and painted. Alternatively, the bonding may be attained by laminating a hot melt adhesive sheet and then heating the resultant lamination under pressure. However, if the heating temperature becomes high, the shape-retainable sheets come to shrink. Thus, it is preferred that the bonding is attained at a temperature at which the shape-retainable sheets do not substantially shrink thermally, that is, at a temperature not higher than the "the melting point of the thermoplastic resin which constitutes the shape-retainable sheets −10° C.". This matter is also applied to the method of laminating a low melting point resin film between the shape-retainable sheets, and then melting and bonding the sheets and the film thermally.

In the case that the shape-retainable sheets are each a laminated sheet of the mono-axially drawn thermoplastic resin sheet and the thermoplastic resin sheet which is not substantially drawn, the thermoplastic resin sheet which is not substantially drawn may be used as an adhesive layer to melt and bond the shape-retainable sheets thermally.

The laminated shape-retainable sheet of the invention has shape retainability in two directions of lengthwise and transverse directions; therefore, the sheet can be used suitably for a core for a brim of a headwear.

The brim of the invention for a headwear is formed by coating the above-mentioned headwear brim core with a coating material. The coating material which can be used may be any known coating material that is used when a headwear is produced. Examples thereof include cloth, an olefin resin sheet, a vinyl chloride resin sheet, and nonwoven cloth.

The method for coating the headwear brim core with the coating material may also be any known method, and examples thereof include a method of coating the headwear brim core with the coating material, and bonding them through an adhesive or binder such as a rubber, acrylate, urethane or silicone adhesive or binder; a method of bonding them through a hot melt adhesive such as ethylene-vinyl acetate copolymer or liner low density polyethylene resin; and a method of sewing them.

The headwear of the invention is formed by fitting the headwear brim to a headwear body. The headwear body which can be used may be any known headwear body that is used when a headwear is produced. Examples thereof include cloth, an olefin resin sheet, a vinyl chloride resin sheet, nonwoven cloth, and straw.

The method for fitting the headwear brim to the headwear body may also be any known method, and examples thereof include a method of fitting the headwear brim to the headwear body, and bonding them through an adhesive or binder such as a rubber, acrylate, urethane or silicone adhesive or binder; a method of bonding them through a hot melt adhesive such as ethylene-vinyl acetate copolymer or liner low density polyethylene resin; and a method of sewing them.

EFFECTS OF THE INVENTION

The structure of the laminated shape-retainable sheet of the invention is as described above, and the sheet has such a sufficient shape retainability that a user can give a desired shape thereto and is light and sanitary.

In the case that nicks or folds are made therein, the sheet is not folded or broken with the production of plosive sounds of paripari even if the sheet is bent. Furthermore, the sheet does not require a press working step for giving a curved shape thereto, and has such a sufficient shape retainability that a user can give a desired shape thereto.

The structure of the core for a brim of a headwear of the invention is as described above. Thus, the core comprises the laminated shape-retainable sheet; therefore, the core has such a sufficient shape retainability that a user can give a desired shape thereto, and is not folded or broken with the production of plosive sounds of paripari even if the core is bent, and is light. Moreover, even if a user sweats or the core is used in rain, the core does not become heavy and is sanitary since the core does not absorb sweat or rainwater.

Accordingly, the headwear brim and the headwear of the invention also have such a sufficient shape retainability that a user can give a desired shape thereto, and are not folded or broken with the production of plosive sounds of paripari even if they are each bent. They are each light. Moreover, even if a user sweats or the headwear is used in rain, the headwear brim and the headwear do not absorb sweat or rainwater; therefore, the headwear does not become heavy, and is sanitary.

The process of the invention for producing a laminated shape-retainable sheet is as described above, and makes it possible to produce a laminated shape-retainable sheet easily. The structure of the folding apparatus of the invention is as described above, and folds can be made evenly, certainly and stably in a mono-axially drawn thermoplastic resin sheet or a laminated sheet in parallel to the axial direction thereof. As a result, the above-mentioned shape-retainable sheet can be stably and easily produced. Even if the sheet is bent in parallel to the axial direction, the sheet is not folded or broken with the production of plosive sounds of paripari.

Figure 1:
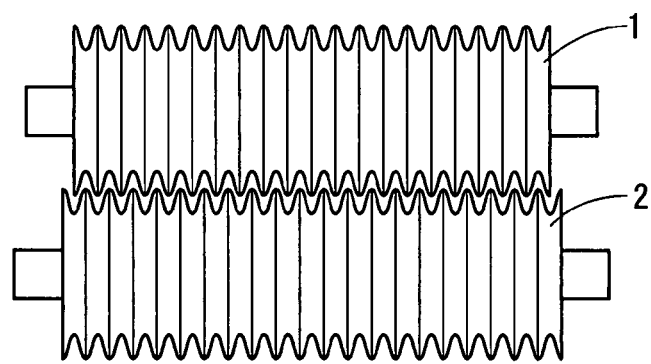
[FIG. 1] It is a side view illustrating an example of a folding apparatus for making folds in a mono-axially drawn thermoplastic resin sheet.

DESCRIPTION OF SYMBOLS 1 upper roll
2 lower roll
11, 13, 15, 21, 23, and 25 convex stripes
12, 14, 16, 22, 24, and 26 concave stripes

BEST MODE FOR CARRYING OUT THE INVENTION

The invention will be described in detail by way of the following examples. However, the invention is not limited to the examples.

Example 1

A high density polyethylene resin (manufactured by Japan Polychem Corp.) having a weight-average molecular weight (Mw) of $3.3 \times 10^5$ and a melting point of 135° C. was supplied to a same-direction twin-axis kneading extruder (manufactured by PLABOR Co., Ltd.) to melt and knead the resin at a resin temperature of 200° C., and then the melted and kneaded product was sheet-molded by means of a calendaring machine wherein the temperature of rolls was controlled to 110° C. so as to yield a polyethylene resin sheet 340 mm in width and 2.7 mm in thickness.

A rolling machine (manufactured by Sekisui Machinery Co., Ltd.) heated to 120° C. was used to roll the resultant polyethylene resin sheet into a rolling ratio of 9.4, thereby yielding a rolled sheet 340 mm in width and 290 μm in thickness.

The resultant rolled sheet was subjected to multistage monoaxial drawing into a ratio of 3.0 by means of a multistage drawing machine (manufactured by Kyowa Engineering Co., Ltd.) of a hot-wind heating type, which was heated to 110° C., so as to yield a mono-axially drawn polyethylene resin sheet, 203 mm in width and 160 μm in thickness, having a total draw ratio of 28.2. The resultant mono-axially drawn polyethylene resin sheet was folded by hand at an angle of about 90° in the draw direction, and then kept for 10 seconds. Thereafter, the force was released so that the shape folded at about 90° was kept.

A cutter knife was used to cut the resultant mono-axially drawn polyethylene resin sheet at intervals of 2 mm in substantially parallel to the draw direction, thereby making nicks. A film laminater (manufactured by Konan Sekkei Kogyo) was used to melt and bond a linear low density polyethylene resin sheet (manufactured by Sekisui Film Co., Ltd.; tensile elasticity: 0.12 Ga), 190 mm in width and 30 μm in thickness, having a melting point of 120° C. thermally (sheet temperature: 125° c.) onto one surface of the mono-axially drawn thermoplastic resin sheet, wherein the nicks were made, by means of its heating roll 160° c. in temperature, thereby yielding a laminated sheet 190 μm in thickness.

The resultant laminated sheet was folded by hand at an angle of about 90° in the draw direction, and then kept for 10 seconds. Thereafter, the force was released so that the shape folded at about 90° was kept. Moreover, the sheet was folded by hand at an angle of about 90° in the direction perpendicular to the draw direction. As a result, sounds of paripari were not produced, and the sheet was not broken, either.

In such a way, four laminated sheets were yielded, and were then overlapped with each other in such a manner that the mono-axially drawn polyethylene resin sheets were alternately overlapped with the linear low density polyethylene resin sheets and further draw directions of adjacent sheets out of the mono-axially drawn polyethylene resin sheets crossed at substantially right angles. A press machine was used to melt and bond the sheets thermally onto each other at 120° C. and 5.0 kg/cm² for 30 seconds. In this way, a laminated shape-retainable sheet 760 μm in thickness was yielded.

The resultant laminated shape-retainable sheet was folded by hand at an angle of about 90°, and then kept for 10 seconds. Thereafter, the force was released so that the shape folded at about 90° was kept. When the sheet was folded, sounds of paripari were not generated and the sheet was not broken, either.

Example 2

Figure 2:
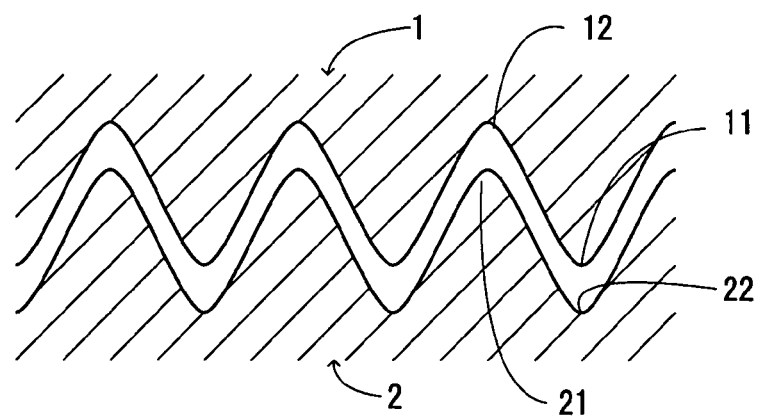
[FIG. 2] It is an enlarged sectional view of a main portion thereof.
Figure 3:
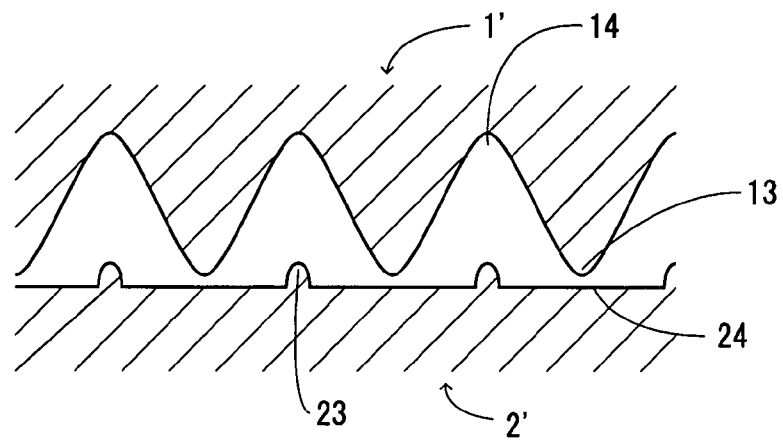
[FIG. 3] It is an enlarged sectional view of a main portion of a different folding apparatus.
Figure 4:
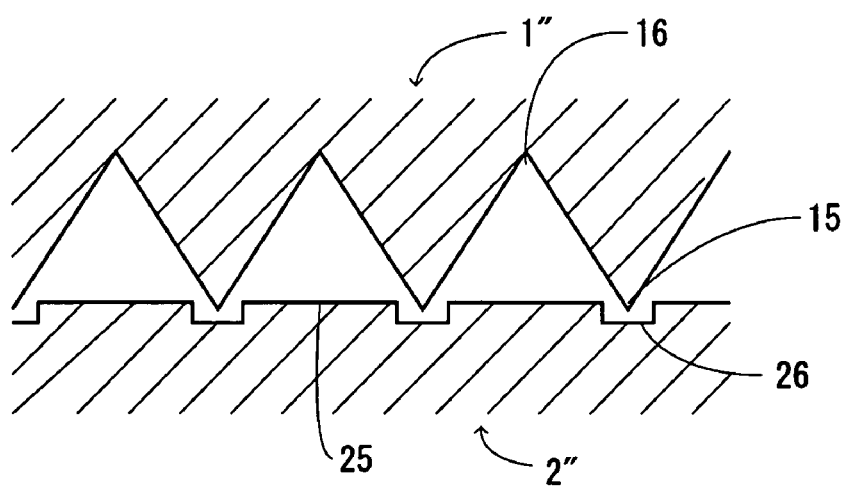
[FIG. 4] It is an enlarged sectional view of a main portion of a different folding apparatus.

The mono-axially drawn polyethylene resin sheet yielded in Example 1 was supplied into the folding apparatus illustrated in FIGS. 1 and 2, and then passed between the upper roll 1 and the lower roll 2, thereby yielding a mono-axially drawn polyethylene resin sheet wherein folds were made at intervals of 2 mm in substantially parallel to the draw direction of the mono-axially drawn polyethylene resin sheet.

The upper roll 1 and the lower roll 2 were freely rotatable, and the pitch of the convex stripes 11 and 21 was 4 mm and the height thereof was 4 mm. The convex stripes 21 of the lower roll 2 were set to go toward the concave stripes 12 of the upper roll 1 by 170 μm from a line for connecting adjacent stripes 11 and 11 out of the convex stripes 11 of the upper roll 1.

A film laminater (manufactured by Konan Sekkei Kogyo) was used to melt and bond a linear low density polyethylene resin sheet (manufactured by Sekisui Film Co., Ltd.; tensile elasticity: 0.12 Ga), 190 mm in width and 30 μm in thickness, having a melting point of 120° C. thermally (sheet temperature: 125° C.) onto one surface of the resultant mono-axially drawn polyethylene resin sheet, wherein the folds were made, by means of its heating roll 160° C. in temperature, thereby yielding a laminated sheet 190 μm in thickness.

The resultant laminated sheet was folded by hand at an angle of about 90° in the draw direction, and then kept for 10 seconds. Thereafter, the force was released so that the shape folded at about 90° was kept. Moreover, the sheet was folded by hand at an angle of about 90° in the direction perpendicular to the draw direction. As a result, sounds of paripari were not produced, and the sheet was not broken, either.

In such a way, four laminated sheets were yielded, and were then melted and bonded thermally onto each other in the same way as in Example 1, so as to yield a laminated shape-retainable sheet 760 μm in thickness. The resultant laminated shape-retainable sheet was folded by hand at an angle of about 90°, and then kept for 10 seconds. Thereafter, the force was released so that the shape folded at about 90° was kept. When the sheet was folded, sounds of paripari were not generated and the sheet was not broken, either.

Example 3

A film laminater (manufactured by Konan Sekkei Kogyo) was used to melt and bond a linear low density polyethylene resin sheet (manufactured by Sekisui Film Co., Ltd.; tensile elasticity: 0.12 Ga), 190 mm in width and 30 μm in thickness, having a melting point of 120° C. thermally (sheet temperature: 125° C.) onto one surface of the mono-axially drawn polyethylene resin sheet yielded in Example 1 by means of its heating roll 160° C. in temperature, thereby yielding a laminated sheet 190 μm in thickness.

In the same way as in Example 2, the resultant laminated sheet was supplied into the folding apparatus, thereby yielding a laminated sheet wherein folds were made at intervals of 2 mm in substantially parallel to the draw direction of the mono-axially drawn polyethylene resin sheet. The convex stripes 21 of the lower roll 2 were set to go toward the concave stripes 12 of the upper roll 1 by 200 μm from a line for connecting adjacent stripes 11 and 11 out of the convex stripes 11 of the upper roll 1.

The resultant laminated shape-retainable sheet, wherein the folds were made, was folded by hand at an angle of about 90° in the draw direction, and then kept for 10 seconds. Thereafter, the force was released so that the shape folded at about 90° was kept. Moreover, the sheet was folded by hand at an angle of about 90° in the direction perpendicular to the draw direction. As a result, sounds of paripari were not produced, and the sheet was not broken, either.

In such a way, four laminated sheets were yielded, and were then melted and bonded thermally onto each other in the same way as in Example 1, so as to yield a laminated shape-retainable sheet 760 μm in thickness. The resultant laminated shape-retainable sheet was folded by hand at an angle of about 90°, and then kept for 10 seconds. Thereafter, the force was released so that the shape folded at about 90° was kept. When the sheet was folded, sounds of paripari were not generated and the sheet was not broken, either.

Example 4

The laminated shape-retainable sheets yielded in Examples 1 to 3 were each supplied into a punching machine to which a Thomson blade was fitted, and punched into a brim shape of a headwear, thereby yielding a core for a brim of a headwear. A piece of cloth was laminated onto each surface of the resultant headwear brim core, and they were sewed together to yield a headwear brim. The brim and a headwear body were sewed and combined to yield a headwear.

The resultant headwear brim core and headwear brim were each folded by hand at an angle of about 90°, and then kept for 10 seconds. Thereafter, the force was released so that the shape folded at about 90° was kept. When they were folded, sounds of paripari were not generated and they were not broken, either.

Example 5

A film laminater (manufactured by Konan Sekkei Kogyo) was used to melt and bond a linear low density polyethylene resin sheet (manufactured by Sekisui Film Co., Ltd.), 190 mm in width and 30 μm in thickness, having a melting point of 120° C. thermally (sheet temperature: 125° C.) onto each surface of the mono-axially drawn polyethylene resin sheet yielded in Example 1 by means of its heating roll 160° C. in temperature, thereby yielding a laminated sheet 220 μm in thickness.

In such a way, four laminated sheets were yielded, and were then overlapped with each other in such a manner that the draw directions of adjacent sheets out of the laminated sheets crossed at substantially right angles. A press machine was used to melt and bond the sheets thermally onto each other at 120° C. and 5.0 kg/cm$^2$ for 30 seconds. In this way, a laminated shape-retainable sheet 880 μm in thickness was yielded. The resultant laminated shape-retainable sheet was folded by hand at an angle of about 90°, and then kept for 10 seconds. Thereafter, the force was released so that the shape folded at about 90° was kept. When the sheet was folded, sounds of paripari were generated.

The resultant laminated shape-retainable sheet was supplied into a punching machine to which a Thomson blade was fitted, and punched into a brim shape of a headwear, thereby yielding a core for a brim of a headwear. A piece of cloth was laminated onto each surface of the resultant headwear brim core, and they were sewed together to yield a headwear brim. The brim and a headwear body were sewed and combined to yield a headwear.

Example 6

A laminated shape-retainable sheet was yielded and then a headwear brim core, a headwear brim and a headwear were yielded in the same way as in Example 5 except that the four laminated sheets yielded in Example 5 were overlapped with each other in such a manner that draw directions of adjacent sheets out of the laminated sheets made an angle of about 60 degrees. The resultant laminated shape-retainable sheet was folded by hand at an angle of about 90°, and then kept for 10 seconds. Thereafter, the force was released so that the shape folded at about 90° was kept. When the sheet was folded, sounds of paripari were generated.

Comparative Example 1

A foamed polyethylene resin sheet (expansion ratio: 5) 1 mm in thickness was supplied into a punching machine to which a Thomson blade was fitted, and punched into a brim shape of a headwear. A press machine was used to press the resultant sheet at 120° C. and 5.0 kg/cm$^2$ for 30 seconds, so as to give a curved shape to the sheet, thereby yielding a core for a brim of a headwear. A piece of cloth was laminated onto each surface of the resultant headwear brim core, and they were sewed together to yield a headwear brim. The brim and a headwear body were sewed and combined to yield a headwear.

The brim region of the resultant headwear was folded by hand at an angle of about 90°, and then kept for 10 seconds. Thereafter, the force was released so that the brim region was restored to substantially the original shape thereof.

INDUSTRIAL APPLICABILITY

The laminated shape-retainable sheet of the invention is not folded or broken with the production of plosive sounds of paripari even if the sheet is bent. The sheet does not require a press working step for giving a curved shape, and has such a sufficient shape retainability that a user can give a desired shape to the sheet. Therefore, the sheet can be used suitably as a core for a brim of a headwear.

Accordingly, a headwear brim wherein this headwear brim core is used is light, and does not absorb sweat or rainwater. Thus, when a user sweats or the brim is used in rain, the brim does not become heavy; and further the brim is sanitary. Accordingly, a headwear wherein this headwear brim is fitted to a headwear body can be preferably used.

The invention claimed is:

1. A brim of a headwear, comprising a core made of a laminated shape-retainable sheet, comprising
    at least two shape-retainable sheets each comprising a mono-axially drawn olefin resin sheet having a total draw ratio of 10 to 40 and a thickness of from 0.1 to 0.5 mm, each having shape retainability in a monoaxial direction, and in which plural nicks or folds are made at intervals of 5 mm or less substantially parallel to the axial direction having the shape retainability, and
    at least one low melting point resin film made of (i) an ethylene/vinyl acetate copolymer or (ii) a linear low density polyethylene resin,
    wherein the low melting point resin film is laminated between the shape-retainable sheets by being heated under pressure and being bonded onto the shape-retainable sheets in such a manner that the monoaxial directions of adjacent shape-retainable sheets make a predetermined angle and do not have any space between the shape-retainable sheets.

2. The brim according to claim 1, which is coated with a coating material.

3. The brim according to claim 1, wherein the predetermined angle is from 45 to 90 degrees.

4. The brim according to claim 1, wherein the mono-axially drawn olefin resin sheet is a mono-axially drawn olefin resin sheet obtained by rolling an olefin resin sheet at a rolling ratio of 5 to 10, and then drawing the resultant mono-axially at a draw ratio of 1.3 to 4.

5. A headwear, comprising the brim according to claim 1 fitted to a headwear body.

* * * * *